May 9, 1961  D. L. LOMBARD  2,983,137
HYDRAULIC PIPE TESTING MACHINE
Filed Nov. 12, 1957  3 Sheets-Sheet 1

May 9, 1961

D. L. LOMBARD 2,983,137

HYDRAULIC PIPE TESTING MACHINE

Filed Nov. 12, 1957

May 9, 1961  D. L. LOMBARD  2,983,137
HYDRAULIC PIPE TESTING MACHINE
Filed Nov. 12, 1957  3 Sheets-Sheet 3
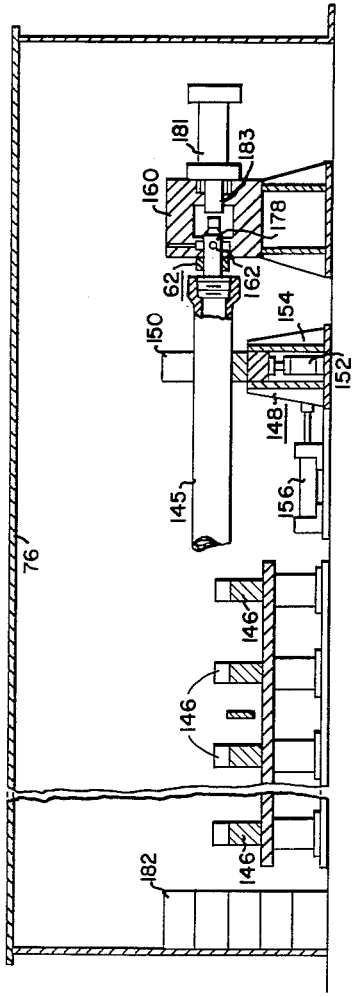
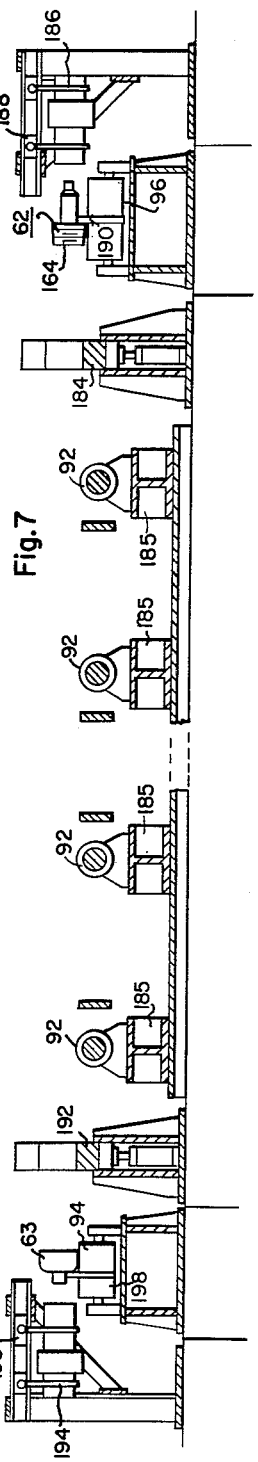
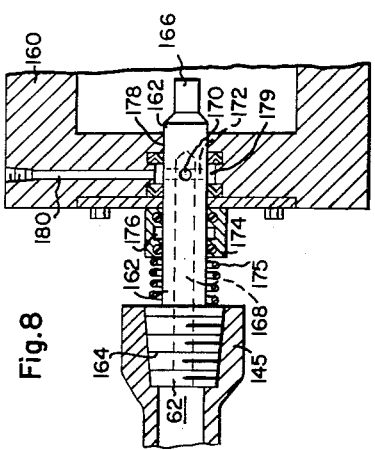

United States Patent Office 2,983,137
Patented May 9, 1961

2,983,137

HYDRAULIC PIPE TESTING MACHINE

Daniel Leo Lombard, Youngstown, Ohio, assignor to Lombard Corporation, Youngstown, Ohio, a corporation of Ohio Filed Nov. 12, 1957, Ser. No. 695,767

10 Claims. (Cl. 73—49.1)

This invention relates to improvements in machines for testing the mechanical strength and fluid tightness of pipes, tubes and the like by subjecting the tube to be tested to a high internal pressure. More particularly, the invention is concerned with a hydraulic pipe testing machine in which one end of the pipe being tested is free to extend longitudinally.

In the past, most hydraulic pipe testing machines have been of the bench type in which two sealing heads are provided which are in axial alignment and movable inwardly relative to each other so as to fit against or over the ends of the pipe to be tested. One of the sealing heads is usually mounted on a hydraulic ram in a stationary housing at one end of the machine, while the other sealing head is usually mounted on a carriage at the other end of the machine, with the last-mentioned carriage being shiftable along the frame of the machine to accommodate pipes of different lengths between the sealing heads. After the pipe to be tested has been placed between the two sealing heads, the latter are moved toward each other to fit against or over the ends of the pipe. Water or some other suitable testing liquid is then directed into the pipe through one of the sealing heads; and, as the pipe is filled, the air displaced by the water is permitted to escape through a suitable air exhaust valve arrangement. When the pipe is completely filled with water or other testing fluid, a relatively high pressure is applied to the testing liquid to determine whether the pipe is sufficiently strong to contain such a pressure in a leak-proof manner.

Bench-type testers of the type described above have many disadvantages. For example, to accommodate pipes of various lengths, it is necessary to shift the position of the aforesaid hydraulic ram or carriage which carries one of the sealing heads. In some installations it is necessary to unlock the aforesaid movable carriage relatively often and shift the same according to the length of pipe involved. In other installations, automatic means are provided for changing the position of the sealing heads in accordance with the length of the next successive pipe to be tested. These arrangements, however, are complicated and expensive and have proved to be undesirable from the user's point of view.

Another disadvantage of the bench-type tester arises by virtue of the fact that its sealing heads must be forced into abutting relationship with the ends of the pipe to be tested. This necessitates the use of a longitudinally directed sealing force on the heads which is considerably larger than the hydraulic force created by the internal fluid pressure. This will subject the pipe to a severe buckling stress which will increase with the high test pressures required. In order to counteract this buckling stress, complicated means have been suggested for the purpose of building up or increasing the sealing pressure on the heads as the test pressure is increased, but in most cases this procedure also has disadvantages. For example, since the pipe tends to shorten due to the internal pressure and compression of the ends by hydraulic pressure, it moves relative to the sealing heads if they are in a fixed location and the sealing effectiveness of the heads is lessened. Further, there is a tendency for the test head connected with the hydraulic ram to move backwards because of the expansion of the hydraulic cylinder walls and compression of air which may be trapped in the system. This results in excessive wear on the packings in the sealing heads which, because of the high test pressures employed, slide over the rough outside surfaces of the pipe. As will be understood, the excessive wear materially reduces the effectiveness of the packings and necessitates frequent replacement of the same.

A still further disadvantage of the bench-type tester arises by virtue of the fact that the sealing heads must fit over portions of the ends of the pipe being tested; and, consequently, these portions are not subjected to the testing pressures. Also, in the bench-type tester, the filling of the pipe with water or testing liquid can be effected in a relatively short period of time if the diameter of the pipe is not much larger than the diameter of the water supply line opening through one of the sealing heads into the pipe. However, when the pipe has a diameter which is substantially larger than that of the water supply line, a relatively long period of time is required to eject air from the pipe and complete the filling with water. It has been observed that this delay in initially filling the pipe to be tested results from the turbulence of the water in the pipe caused by the abrupt passage from the relatively small diameter water supply line into the relatively large diameter pipe. This turbulence causes air to be trapped within the pipe during the testing operation and reduces the effectiveness of the machine.

It is a principal object of this invention to provide a new and improved hydraulic pipe testing machine which overcomes the shortcomings of bench-type testers.

Another object of the invention is to provide a pipe testing machine in which one end of the pipe being tested is free to extend along its longitudinal axis. In this way, the pipe is subjected to both longitudinal and radial forces.

A further object of the invention is to provide a hydraulic pipe testing machine in which the pipe is filled with liquid before testing by submerging the pipe in a liquid-filled tank. In this manner, the water naturally displaces the air within the pipe and the problem of turbulence within the pipe is eliminated or materially reduced.

Another object of the invention is to provide apparatus for testing the strength of pipe having its opposite ends threaded and wherein the strength of the threads is also tested by being subjected to the hydraulic testing pressure.

A still further object of the invention is to provide a hydraulic pipe testing machine in which no adjustments need be made for different pipe lengths.

As will become apparent from the following description, the present invention achieves the foregoing objects by first submerging the pipe to be tested in an open tank filled with testing fluid. As the pipe is submerged, the testing fluid will displace the air within the pipe. Thereafter, while the pipe is still submerged, the ends of the pipe are fitted with a pair of sealing caps. In the embodiment of the invention shown herein, the ends of the pipe to be tested are threaded so that the sealing heads are threaded onto the opposite ends of the pipe. One of the sealing heads is provided with a small passage extending therethrough so that, after the pipe is filled with water and the sealing caps are applied to its opposite ends, it is lifted out of the filling tank and transferred to a testing station where high pressure fluid is forced into the pipe through the aforesaid passage. During the testing operation, the pipe is free to expand longitudinally, thereby eliminating the buckling stress present in bench-type testers.

The above and other objects and features of the invention will become apparent from the following detailed description taken in connection with the accompanying drawings which form a part of this specification and in which:

Fig. 6 is a sectional view taken along line VI—VI of Fig. 1 showing the means for injecting high pressure fluid into the interior of a pipe being tested;

Fig. 7 is a sectional view taken along line VII—VII of Fig. 1 showing the means for unscrewing the testing heads from opposite ends of a pipe after it has been tested; and Fig. 8 is a detailed view of the means for injecting high pressure fluid into the interior of a pipe to be tested after the pipe is prefilled with testing liquid.

*General arrangement of invention*

Figure 2:
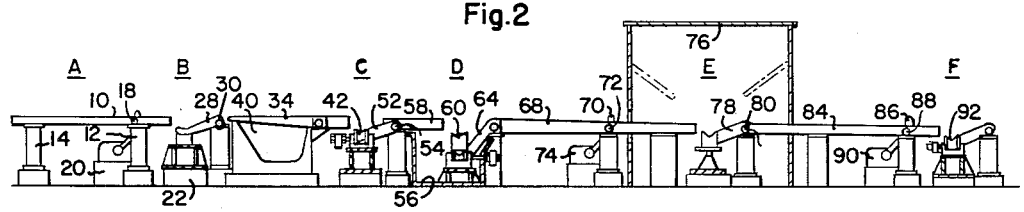
Fig. 2 is a sectional view taken along line II—II of Fig. 1.
Figure 1:
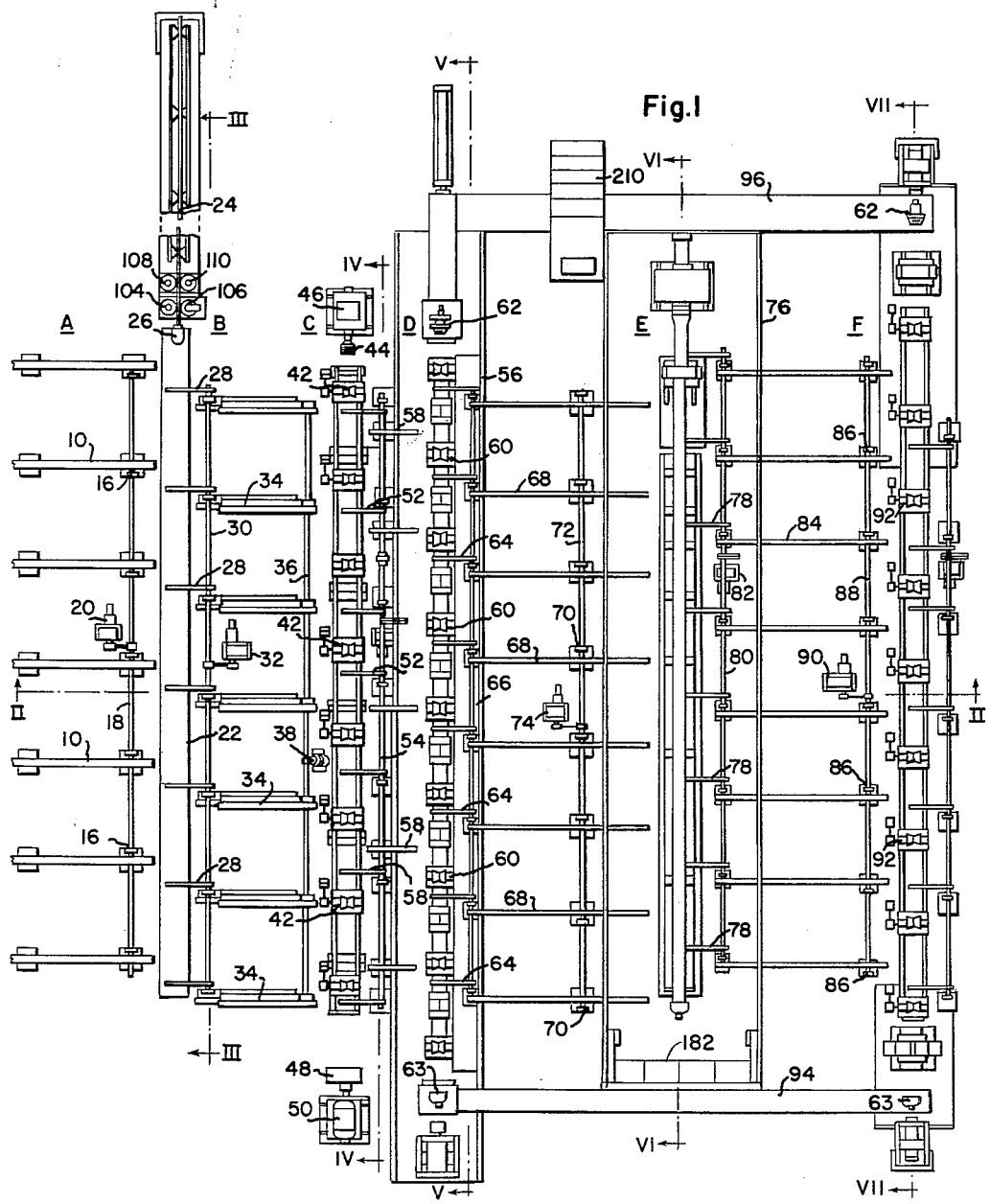
Figure 1 is an over-all plan or horizontal view of the pipe testing machine of the present invention together with the apparatus for conveying pipes to and from the testing machine.

Referring to Figs. 1 and 2, the tester of the present invention consists of six processing stations A, B, C, D, E and F through which a pipe is conveyed. Pipe which is to be tested is placed at station A on a set of seven entry skids 10 which may be fabricated from rolled structural steel shapes and supported at each end and in the middle on welded steel stands 12 and 14. In the particular embodiment of the invention shown herein, one end of the pipe to be tested is internally threaded, while the other end is externally threaded. As shown in Fig. 1, the internal threads will be at the top of the apparatus, whereas the external threads will be at the bottom. An escapement mechanism is provided at the delivery end of the skid and incorporates seven cam discs 16 arranged on a shaft 18 which is operated by a motor and gear reducer arrangement 20. When the escapement cams 16 permit a pipe to roll down the delivery end of the skids 10, the pipe rolls onto a pipe table 22 at station B which consists of a continuous V-trough supported on a guide frame. Screw jacks are provided to adjust the V-trough in elevation to suit various pipe diameters. At this station B a drifter rod 24, having a plug 26 secured to its forward end, is forced into the interior of the pipe. Obviously, if there are any obstructions within the interior of the pipe, plug 26 will engage these obstructions to indicate that the pipe is defective.

After the drifter rod 24 is forced into the interior of the pipe and withdrawn, seven kick-out arms 28 are rotated by shaft 30 which is driven by a motor and gear reducer arrangement 32. If the pipe is found not to be defective, the kick-out arms 28 convey it onto a series of seven crossover arms 34 where it rolls to the third station C. The crossover arms 34 are pivotally mounted on a shaft 36 driven by an air cylinder 38. If the pipe is found to be defective by the action of drifter rod 24, the crossover arms 34 are rotated clockwise as shown in Fig. 2 whereby the defective pipe will fall into a reject pocket 40.

At station C the pipe rests on a series of driven rollers 42 which convey the pipe to one end of the station where the internal threads on the pipe engage a male greasing head 44 which is driven by a motor 46. After the internal threads of the pipe are greased, the rollers 42 are reversed whereby the external threads of the pipe are fitted into a female greasing head 48 which is driven by a motor 50 at the other end of station C. After the threads on the ends of the pipe are greased, seven kick-off arms 52 are rotated by shaft 54 which is driven by a motor and gear reducer arrangement, not shown. As will be understood, any suitable means may be employed to automatically apply fresh grease to the heads 44 and 48 after a greasing operation has been completed.

At station D is an elongated tank 56 which is filled with water or some other suitable testing liquid. As the pipe is lifted by kick-off arms 52 at station C, it rolls onto entry skids 58 at station D and onto an elevator, hereinafter described, which then submerges the pipe in the liquid-filled tank 56. In this process, the air within the pipe is displaced by the testing liquid and escapes to the surface from the open ends of the pipe. While the pipe is submerged in tank 56, it is first conveyed to one end of tank 56 by a set of driven rollers 60 where a female testing head 63 is threaded into the pipe by means which will hereinafter be described. Thereafter, the rollers 60 convey the pipe to the other end of the tank where a male sealing head 62 is threaded onto the other end of the pipe. Head 63 completely seals its end of the pipe, while the male head 62 is provided with means, hereinafter described in detail, which permits high pressure testing fluid to be injected into the interior of the pipe.

After the pipe is completely filled with liquid and the sealing heads applied, the pipe is elevated from the bottom of tank 56 and seven kick-off arms 64 are rotated by shaft 66 which is driven by suitable means, not shown. This causes the pipe to roll onto skids 68 where they come to rest against an escapement device which consists of seven escapement cams 70 rotated by a shaft 72, the shaft in turn being driven by motor and gear reducer arrangement 74. When shaft 72 is rotated in a clockwise direction as shown in Fig. 2, a single pipe is permitted to roll to station E where apparatus, hereinafter described, forces high pressure fluid through a passageway in the male fitting 62 and into the interior of the pipe. As shown, station E is entirely surrounded by a metal casing 76 so that, in the event a pipe ruptures in the testing process, operating personnel will be protected from flying pieces.

After the testing operation is completed, seven kick-off arms 78 are rotated by shaft 80, which is driven by motor and gear reducer arrangement 82, to roll the tested pipe onto skids 84 where they come to rest against another escapement mechanism comprising seven escapement cams 86 which are rotated by a shaft 88, the shaft in turn being driven by motor and gear reducer arrangement 90. When the escapement cams 86 permit a pipe to pass, it rolls onto station F where a set of driven rollers 92 convey the pipe to one end of the station where the male testing head 62 is unscrewed and then to the opposite end of the station where the female head 63 is removed. Thereafter, the heads which have been removed are conveyed by belt conveyors 94 and 96 to station D where they are again threaded onto pipes which are submerged in tank 56.

*Detailed description of pipe processing stations*

Figure 3:
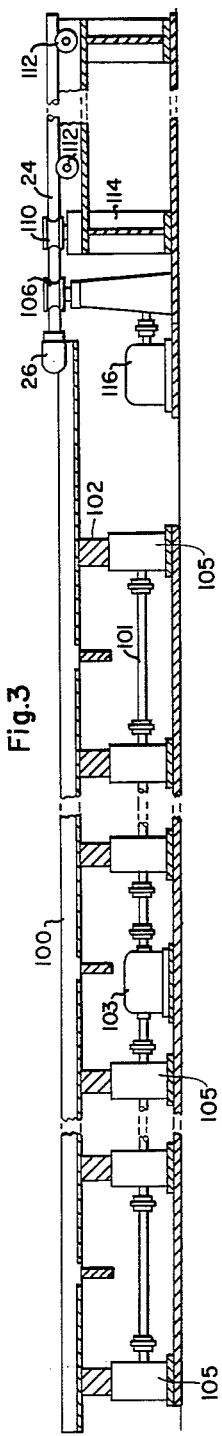
Fig. 3 is a sectional view taken along line III—III of Fig. 1 showing the means for detecting obstructions within a pipe which is to be tested.

Referring to Fig. 3, the pipe table 22 at station B consists of a continuously V trough 100 supported on a guide frame, generally indicated at 102. The V trough 100 is adjusted for a desired elevation to suit various pipe sizes by screw jacks which are driven in synchronism by a shaft 101 powered by motor and gear reducer 103. The drifter rod 24 is driven by a pair of spring loaded pinch rolls 104 and 106, best shown in Fig. 1. Directly behind the pinch rolls are a second pair of guide rolls 108 and 110. In its withdrawn position, the drifter rod 24 is supported on V rollers 112 which are mounted on a structural steel framework 114. The pinch rolls 104 and 106 are driven by a motor and gear reducer arrangement 116, the arrangement being such that as the pinch rolls are rotated in one direction or the other, the drifter rod is forced to move into, or is withdrawn from, the interior of a pipe being tested.

Figure 4:
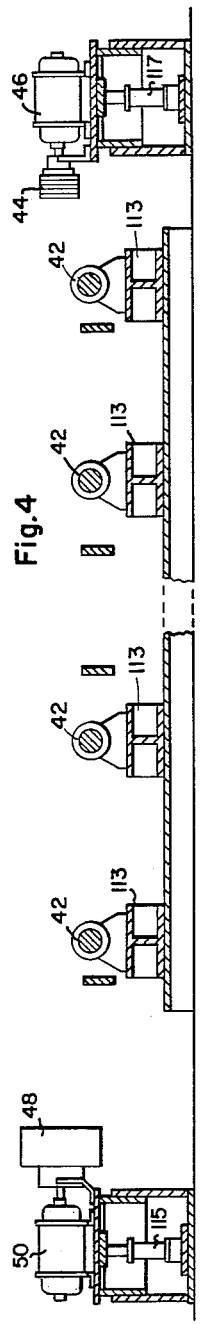
Fig. 4 is a sectional view taken along line IV—IV of Fig. 1 showing the apparatus for greasing the threads at the opposite ends of a pipe to be tested.

Referring to Fig. 4, the driven rollers 42 at station C are each supported on a welded steel stand 113. Means, not shown, are provided for automatically applying grease to the male and female greasing heads 44 and 48, respectively. Jacks 115 and 117 are provided to adjust the height of the greasing heads to acommodate various pipe diameters.

Figure 5:
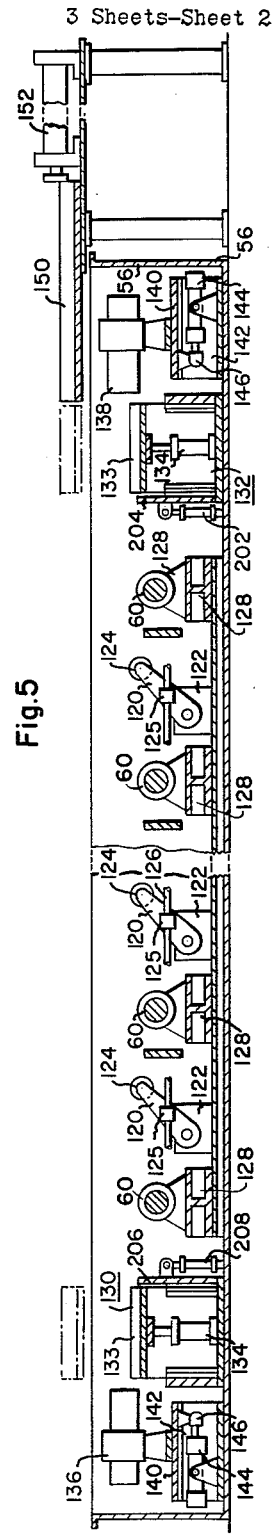
Fig. 5 is a sectional view taken along line V—V of Fig. 1 showing the pipe filling tank together with the means for threading sealing heads on opposite ends of a pipe to be tested.

Referring to Fig. 5, the equipment in station D comprises a pipe elevator consisting of a series of spaced arms 120 pivotally connected to blocks 122 which rest on the bottom of tank 56. Although only one arm 120 is shown in Fig. 5 for each block 122, two arms are provided in actual practice, one on each side of the block 122. The upper extremities of these arms are interconnected by an axle which supports a roller member 124. Pivotally connected to the side of each of the arms shown in Fig. 5 is a clamping block 125 through which an actuating rod 126 passes, the actuating rod being secured to each of the blocks. In this manner, as shaft 126 is moved forward or backward, each of the arms 120 and its associated roller 124 is forced to rotate in one direction or the other. Since the arms are interconnected, they rotate in synchronism so that the elevational positions of the rollers 124 on each set of arms are the same.

When a pipe is first received at station D, the arms 120 will be rotated whereby the rollers 124 are elevated. After the pipe to be tested rolls onto the rollers 124, shaft 126 is moved to rotate arms 120 clockwise and thereby lower the rollers 124 and the pipe carried thereby. In this process, the pipe will come to rest on the driven rollers 60, each of which is supported on a welded steel frame 128. At each end of tank 56, two elevators 130 and 132 are provided. These elevators serve to lower a testing head which is delivered by conveyor 94 or 96 (Fig. 1) from an upper position, shown by the dotted lines, to a lower position where the sealing heads are in axial alignment with the submerged pipe. As shown, each elevator comprises a tray or trough 133 which is supported on a hydraulic cylinder 134, the arrangement being such that the trough 133 and the sealing head which it carries may be lowered or raised by manipulating cylinder 134.

In order to thread the sealing heads onto opposite ends of the pipe, two torque wrenches 136 and 138 are provided. Each of these wrenches is mounted on a skid 140 which slides on ways formed in a welded steel base 142. Skids 140 and torque wrenches 136, 138 are moved back and forth on the aforementioned ways by a hydraulic cylinder 144 which is pivotally connected to supports extending upwardly from the base 142 and has its piston rod connected at 146 to the skid 140. Obviously, the height of the torque wrenches 136 and 138 must be adjusted for pipes of varying diameters since the longitudinal or central axis of pipes of different diameters will be at different elevations when they rest on the rollers 60. Accordingly, means, not shown, are provided for adjusting the height of the torque wrenches 136 and 138. The male sealing head 62 will be deposited on a tray 150 at one end of the tank 56. When the sealing head is so deposited, the trough 133 of the elevator 132 is raised until it is in alignment with the trough 150. Thereafter, hydraulic cylinder 152 pushes the sealing head to the left and onto the trough 132. The trough is then lowered into axial alignment with the pipe which is supported on rollers 60. At the same time, the trough 133 of the elevator 130 at the other end of the tank 56 is raised to the position shown by the dotted lines where the female sealing head 63 is deposited thereon. Thereafter, the elevator 130 is lowered whereby the sealing head is brought into axial alignment with the pipe and the torque wrench 136. After the two sealing heads are in axial alignment with the pipe and the two torque wrenches 136 and 138, control means, not shown, cause the torque wrenches to rotate and the hydraulic cylinders 144 force the skids 140 and the torque wrenches toward the ends of the pipe where they first engage a fitting on the end of the sealing head. When the fitting is thus engaged, the sealing head begins to rotate and the torque wrenches are thereafter moved toward the ends of the pipe where they thread the sealing heads onto its ends.

After the filling operation is completed at station D, the pipe, with the sealing heads applied, is delivered to station E, shown in Fig. 6. At this station the pipe 145 rests on a plurality of supports 146 and is engaged at one end by a clamping device 148. As shown, the clamping device comprises a pair of pivoted heads 150 which may be opened or closed by a hydraulic cylinder 152. The carriage 154 which carries the clamping mechanism is mounted on a track structure whereby a hydraulic cylinder 156 may be actuated to force the clamping device and the pipe held thereby to the right. When a pipe is deposited on supports 146, the clamping mechanism 148 grips the end of the pipe, and cylinder 156 forces the clamping mechanism 148 to the right as shown in Fig. 6 whereby a cylindrical shaft 162 on the male sealing head is forced into a circular opening provided in a test head, generally indicated at 160.

The male sealing head and its associated test head are shown in detail in Fig. 8. As shown, the sealing head comprises the elongated cylindrical shaft 162 having an expanded portion 164 at its left end which is threaded to fit into the internal threads of a pipe 145 being tested. The other end of the shaft 162 is provided with a rectangular fitting 166 which is engaged by the torque wrench 138 to thread the fitting into the pipe. Extending through the test head is an axial passageway 168 which communicates with the two radial passageways 170 and 172 which extend through the shaft 162. Surrounding the shaft 162 is an annular sealing ring 174 having an annular passageway 176 which normally covers the passageways 170 and 172. That is, until the sealing head is forced into testing head 160 as shown in Fig. 8, a coil spring 175 will force the annular sealing member 174 to the right where passageway 176 will surround the passageways 170 and 172, thereby preventing the escape of fluid from the interior of the pipe. When clamping mechanism 148 is forced to the right by cylinder 156, however, the shaft 162 will extend into an annular bore 178 in the test head 160 as shown in Fig. 6, thereby forcing the sealing member 174 to the left to uncover the passageways 170 and 172. Bore 178 is provided with an annular recessed passageway 179 which communicates with a second passageway 180 which leads to a source of high pressure fluid, not shown. Thus, when the shaft 162 is forced into bore 178, member 174 is forced to the left to uncover passages 170 and 172, but at the same time these passages come into registry with passageway 179. Thereafter, high pressure fluid is forced through passageways 180, 179, 170, 172 and 168 into the interior of the pipe. If the pipe cannot withstand the high internal pressure to which it is subjected, it will obviously rupture; but the housing 76 will prevent flying debris from injuring operating personnel. As shown, sandbags 182 are provided at the left end of housing 76 to act as a cushion in the event the pipe ruptures.

After the testing operation is completed, a hydraulic cylinder 181 in testing head 160 is pressurized to force member 183 to the left as shown in Fig. 6. In this process the member 183 engages the fitting 166 on shaft 162 to thereby force the male sealing head 62 out of the test head 160. Thereafter, the pipe is conveyed to station F where it comes to rest on the driven rollers 92 as shown in Fig. 7. These rollers, supported on welded steel stands 185, are first actuated to move the pipe in one direction and then in the other direction. For purposes of illustration, it will be assumed that the pipe is first moved to the right where it passes through a clamping mechanism 184 similar to clamping mechanism 148 shown in Fig. 6. After the pipe is moved to the right and clamped by mechanism 184, a torque wrench 186, mounted on an overhead track 188, is moved to the left where it engages the fitting 166 on the end of the male sealing head 62 and disengages the sealing head from the end of the pipe. Thereafter, the torque wrench 186 is moved back to its original position. In this process the expanded portion 164 of the male sealing head 62 engages a projection 190 on the conveyor 96. Then the sealing head is transferred by the conveyor back to station D where it is again threaded into a pipe which is to be tested.

After the male sealing head at the right end of the pipe is removed, clamp 184 releases the pipe, and rollers 92 convey the pipe to the left end of station F as shown in Fig. 7 where it is engaged by a second clamping mechanism 192. At this end of the pipe a second torque wrench 194, mounted on an overhead rail 196, is moved into engagement with the female sealing head 63 to remove the same. As wrench 194 is moved backward on its rail 196, sealing head 63 engages projection 198 on conveyor 94 and is transported back to station D. After both sealing heads are removed by the process described above, the pipe is then conveyed to a receiving conveyor. Means, not shown, are provided to adjust the height of torque wrenches 186 and 194 to accommodate various pipe diameters.

*Description of operation of invention*

In operation, pipe to be tested is deposited on the entry skids 10 where the ends of the pipe are aligned and positioned adjacent the drifter head 26. The pipes are restrained from rolling toward the V-trough 100 at station b by the escapement cams 16. These cams are actuated to permit one pipe at a time to roll onto the V-trough 100 while holding the remaining pipe from moving. This action may be instituted by a limit switch for motor and gear reducer 20 which is tripped by the kick-off arms 28 as they return to their down position.

When the pipe rolls onto V-trough 100, it trips a limit switch which causes motor and gear reducer 116 (Fig. 3) to rotate driven rollers 104 and 106. This action forces the drifter rod 24 and plug 26 into the interior of the pipe. Means are provided which reverse rollers 104 and 106 after the rod 24 has traveled a predetermined maximum path of travel. This action then returns the rod 24 and plug 26 to their original position shown in the drawings. If the drifter plug 26 has become lodged in the pipe, rollers 104 and 106 are reversed to remove the plug and rod 24. Either the plug remains lodged in the pipe and the rod returns, shearing the connection between these two elements; or the plug is withdrawn by the rod if it has not become securely lodged. In either case, as long as the extreme travel limit switch for the drifter plug has not been tripped, the drifter rod returns to its starting position and the kick-off mechanism 32 controlling kick-off arms 28 is not actuated. The operator must then inspect the pipe, install a new drifter plug, and press a pushbutton which actuates air cylinder 38 to raise the reject crossover arms 34, allowing the pipe to be discarded into reject pocket 40 when the kick-off arms 28 are raised. The crossover arms 34 are thereafter dropped and the system is again returned to normal cycling.

Assuming that the drifter rod passes through the pipe without engaging an obstruction, the kick-off arms 28 will raise the pipe and permit it to roll onto crossover arms 34 and onto rollers 42 at the greasing station C. When the pipe engages the rollers 42, it trips a limit switch which starts the roller drive motors and moves the right end of the pipe, as shown in Fig. 4, into engagement with the male greasing head 44. Thereafter, the greasing head 44 is rotated by its associated motor to apply a covering of grease to the internal threads of the pipe. After several revolutions, the motor for greasing head 44 is stopped and the motors for rollers 42 are automatically started in the reverse direction, carrying the left end of the pipe to the opposite end of the conveyor where it comes into engagement with the female greasing head 48. The motor for head 48 is then rotated and the greasing operation is completed. Thereafter, the rollers 42 are again reversed and the kick-off arms 52 are actuated to elevate the pipe whereby it rolls across skids 58 and onto the rollers 124 at station D. During this time, the arms 120 are in the elevated position shown in Fig. 5. After the pipe comes to rest on the rollers 124, it actuates a limit switch which causes the actuating rod 126 to force each of the arms 120 in a clockwise direction whereby the rollers 124 and the pipe carried thereby are moved downward and into engagement with the driven rollers 60.

As the pipe is being lowered by arms 120, the sealing heads for the opposite ends of the pipe are lowered by elevators 130 and 132 into axial alignment with the torque wrenches 136 and 138 and the pipe which is now submerged below the water level in tank 56. As will be understood, when the pipe is thus submerged, it becomes completely filled with the testing liquid.

As the pipe comes to rest on the driven rollers 60 at the bottom of the tank, it trips a limit switch which actuates a hydraulic cylinder 208 to raise a pipe stop plate 206. At the same time, rollers 60 convey the left end of the pipe into engagement with the raised stop plate. Subsequently, cylinder 144 forces carriage 140 and torque wrench 136 to the right as shown in Fig. 5 whereby an adaptor on the wrench engages a fitting on the end of the female sealing head 63. If the sealing head "walks away" from the adaptor during engagement, it bumps into the pipe stop 206 which limits endwise motion of the head. After the pipe is in position and the sealing head engaged by the torque wrench, cylinder 208 is pressurized to lower plate 206; and the wrench advances with the sealing head revolving. In this process the sealing head is threaded onto the end of the pipe. Thereafter, the cylinder 144 is reversed to withdraw the wrench 136, and rollers 60 are reversed to convey the pipe to the right as shown in Fig. 5 until it engages a second pipe stop plate 204 which is raised by the action of hydraulic cylinder 202. The operation just described is repeated for the second end to thread the male sealing head 62 into the pipe.

During the screwing-on operations, the pipe is not clamped. The inertia of the pipe alone insures that the impact wrenches tighten the sealing heads sufficiently for a tight seal. After the sealing heads have been screwed on, a limit switch is tripped which causes rod 126 to rotate arms 120 counter-clockwise, thereby elevating the pipe. The kick-off arms 64 are then rotated to roll the pipe, which is now filled with liquid with both testing heads applied, onto skids 68 where it comes to rest against escapement cams 70.

When the escapement cams 70 are actuated at the completion of the test of a previous pipe, the pipe with the sealing heads applied is permitted to roll onto the supports 146 at station E. Thereafter, clamping mechanism 148 engages the right end of the pipe as shown in Fig. 6 and cylinder 156 forces the pipe and the shaft 162 on the male fitting head into the bore 178 provided in the testing head 160. High pressure fluid is then forced into the interior of the pipe through passageways 180, 170, 172 and 162. Due to the design of the male sealing head 62, the pipe being tested is in a state of hydraulic equilibrium; and, therefore, there is no tendency for it to be ejected from the head 160 when pressure is applied. That is, the effective pressure area on head 62 is equal to that on head 63; and, consequently, the two forces balance each other.

After the testing operation is completed, cylinder 181 on test head 160 is pressurized to force member 183 to the left, thereby ejecting the sealing head 62 and the pipe. Since the diameter of member 183 is the same as that of shaft 162 on head 62, it slides into bore 178 during the ejection operation and seals passageways 179 and 180 leading to the source of high pressure fluid. The member 183 remains in this position until the sealing head on the next subsequent pipe to be tested pushes it back into its original position. Now kick-off arms 78 are rotated in a clockwise direction whereby the tested pipe rolls onto skids 84 and into engagement with escapement cams 86. When the escapement cams 86 permit a pipe to pass, it rolls onto the rollers 92 at station F where the sealing heads are removed in the manner already described. Finally, the sealing heads are conveyed by conveyors 94 and 96 back to station D where they are again applied to a pipe which is filled with testing liquid by submerging the same in tank 56.

The entire operation of the machine may be set up for either fully automatic, semi-automatic or manual control by means well known in the art. Necessary electrical circuits, limit switches, time delay relays and the like, although not shown herein, will be provided to effect the type of operation desired. Controls for all machine functions are provided at an operator's pulpit, generally indicated at 210 in Fig. 1.

Although the invention has been shown in connection with a certain specific embodiment, it will be readily apparent to those skilled in the art that various changes in form and arrangement of parts may be made to suit requirements without departing from the spirit and scope of the invention. In this respect, it is apparent that if the opposite ends of the pipe to be tested are not threaded, suitable testing heads may be provided which clamp onto, or are otherwise affixed to, the ends of the pipe while it is submerged in tank 56.

I claim as my invention:

1. In hydraulic pipe testing apparatus, the combination of an open tank filled with a liquid, apparatus for submerging pipe to be tested into said tank whereby the pipe will become filled with liquid, means for sealing the opposite ends of a pipe while the same is submerged in said tank, a normally closed passageway in the sealing means for one end of the pipe, means for elevating said pipe out of the tank after its ends are sealed, and means for thereafter opening said normally closed passageway and for forcing fluid under pressure into the interior of said pipe through the passageway.

2. In apparatus for hydraulically testing a pipe having its opposite ends threaded, the combination of an open tank filled with a liquid, means for submerging a pipe to be tested in said tank whereby the pipe becomes filled with liquid, a pair of sealing caps adapted to be threaded onto opposite ends of said pipe, a normally closed passageway in one of said sealing caps, means for threading said caps onto the ends of said pipe while the same is completely submerged, means for elevating said pipe out of said tank after the caps are threaded onto its ends, and means for thereafter opening said normally closed passageway and for injecting high pressure fluid into said pipe through the passageway.

3. In hydraulic pipe testing apparatus, the combination of an open tank filled with a liquid, apparatus for submerging pipe to be tested into said tank whereby the pipe will become filled with liquid, sealing members for the opposite ends of said pipe, one of said sealing members being provided with a normally closed passageway to permit the entrance of high pressure fluid, apparatus for applying said sealing members to the opposite ends of a pipe while the same is submerged in said tank, and means for thereafter opening said normally closed passageway in said one sealing member and for injecting high pressure fluid into said pipe through the passageway.

4. In apparatus for hydraulically testing a pipe having its opposite ends threaded, the combination of an open tank filled with a liquid, means for submerging a pipe to be tested into said tank whereby the pipe becomes filled with liquid, a pair of sealing caps adapted to be threaded onto opposite ends of said pipe, one of said caps being provided with a normally closed passageway to permit the entrance of high pressure fluid into the interior of said pipe, a pair of torque wrenches located below the surface of liquid in said tank for threading said sealing caps on the opposite ends of said pipe while the same is submerged, means for elevating said pipe out of the tank after the sealing caps are threaded onto its opposite ends, and means for thereafter opening said normally closed passageway and for forcing fluid under pressure through the passageway.

5. In apparatus for hydraulically testing a pipe having its opposite ends threaded, the combination of an open tank filled with a liquid, means for submerging a pipe to be tested in said tank whereby the pipe becomees filled with liquid, a pair of sealing caps adapted to be threaded onto opposite ends of said pipe, a pair of torque wrenches located below the surface of the liquid at opposite ends of said tank, said wrenches being rotatable about a common axis for threading said sealing caps onto the opposite ends of said pipe, and roller members located below the surface of said liquid for transporting a pipe from one end of the tank where the threads on an end of the pipe engage a sealing cap held by one torque wrench to the other end of the tank where the threads on the other end of the pipe engage a sealing cap held by the other torque wrench.

6. The combination claimed in claim 5 and including apparatus for raising or lowering the torque wrenches whereby the axis about which they rotate may be brought into alignment with the longitudinal axis of a pipe of any diameter.

7. In apparatus for hydraulically testing pipe having its opposite ends threaded, the combination of means for conveying pipe to be tested through a plurality of stations from a loading station to an unloading station, means at a first of said stations for greasing the threads at opposite ends of said pipe, an open tank filled with liquid at a second of said stations, means at said second station for submerging a pipe to be tested in said tank whereby the pipe becomes filled with liquid, a pair of sealing caps adapted to be threaded onto opposite ends of said pipe, a normally closed passageway leading through one of said caps, means at said second station for threading said sealing caps onto opposite ends of said pipe while the same is submerged, means at a third of said stations for opening the passageway in said one cap and for forcing high pressure fluid through the passageway into the interior of said pipe, and apparatus at a fourth of said stations for removing the sealing caps from the opposite ends of said pipe.

8. The combination claimed in claim 7 and including apparatus for conveying sealing caps which are removed at said fourth station to said second station.

9. In apparatus for hydraulically testing pipe, the combination of means for conveying pipe to be tested through a plurality of stations from a loading station to an unloading station, an open tank filled with liquid at a first of said stations, means at said first station for submerging a pipe in said tank whereby the pipe becomes filled with liquid, further means at said first station for sealing the opposite ends of said pipe while hte same is submerged, means at a second of said stations for placing the fluid in said pipe under high pressure, a protective enclosure surrounding said second station for protecting operating personnel against flying debris in the event the pipe ruptures under said high pressure, and means at a third of said stations for removing the seals from the opposite ends of said pipe.

10. In hydraulic pipe testing apparatus, the combination of means for filling a pipe to be tested with liquid, a pair of sealing caps, means for applying said sealing caps to opposite ends of said pipe after the same has been filled with liquid, a pssageway extending through one of said caps and having one end which communicates with the interior of said pipe and another end adapted for connection to a source of high pressure fluid, a sealing member normally covering said other end of the passageway to prevent the escape of fluid from the interior of said pipe, and apparatus for selectively removing the sealing member from said other end of the passageway and for connecting a source of high pressure fluid to said other end.

References Cited in the file of this patent

UNITED STATES PATENTS

| Number | Name | Date |
|---|---|---|
| 1,765,825 | Cork | June 24, 1930 |
| 2,293,471 | Protin | Aug. 18, 1942 |
| 2,398,328 | Rogers | Apr. 9, 1946 |
| 2,532,954 | Sherer et al. | Dec. 5, 1950 |
| 2,565,460 | Woodlief | Aug. 21, 1951 |
| 2,633,739 | Potts et al. | Apr. 7, 1953 |
| 2,673,462 | Thompson | Mar. 30, 1954 |
| 2,870,794 | Thaxton | Jan. 27, 1959 |
| 2,873,764 | Lombard | Feb. 17, 1959 |